Figure 1:
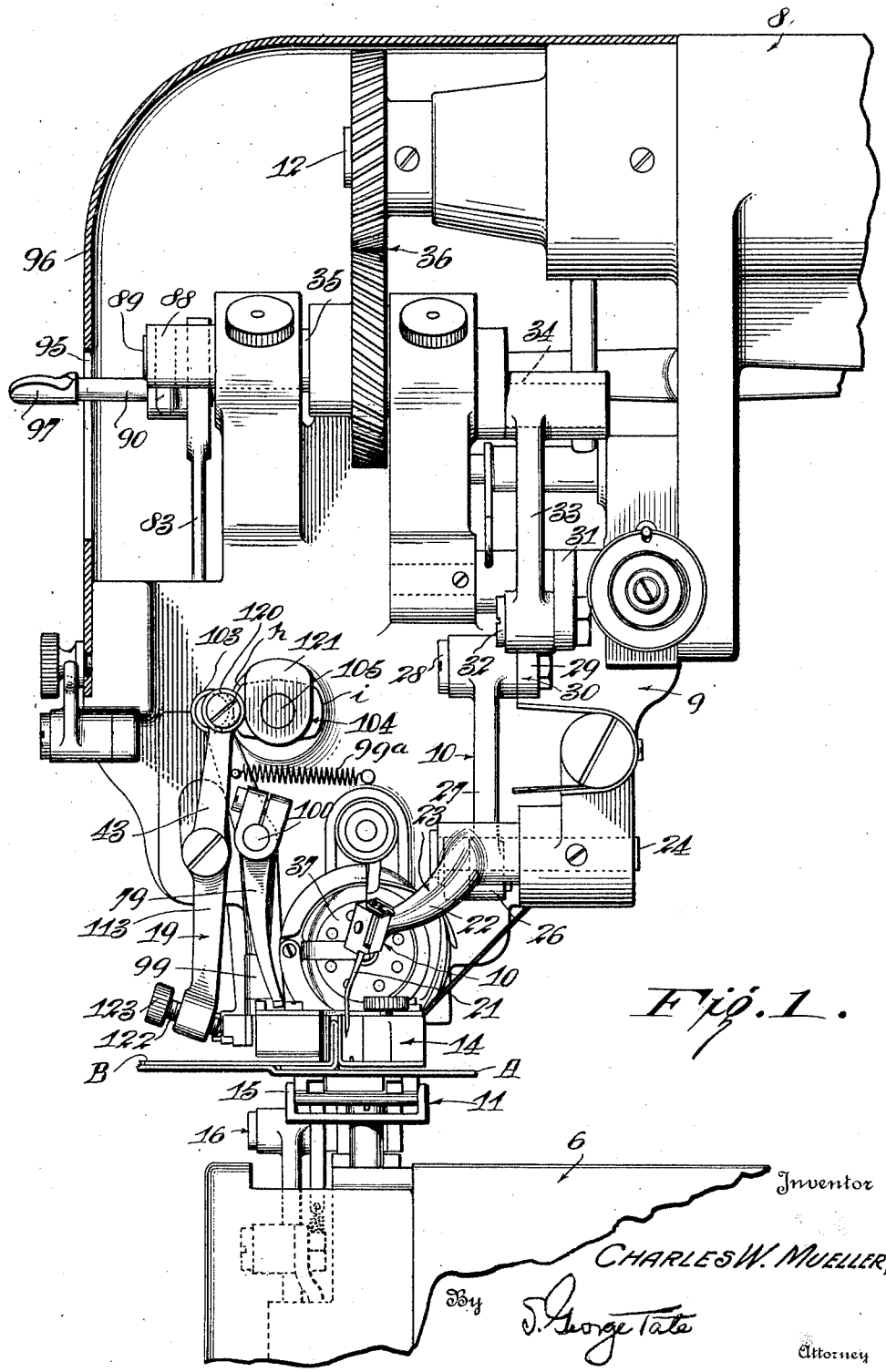

Dec. 10, 1929.  C. W. MUELLER  1,739,080
LINING FELLING MACHINE
Filed Aug. 26, 1927  6 Sheets-Sheet 1

Inventor
CHARLES W. MUELLER,
By J. George Tate
Attorney

Dec. 10, 1929.  C. W. MUELLER  1,739,080
LINING FELLING MACHINE
Filed Aug. 26, 1927  6 Sheets-Sheet 2

Inventor
CHARLES W. MUELLER,
By J. George Tate
Attorney

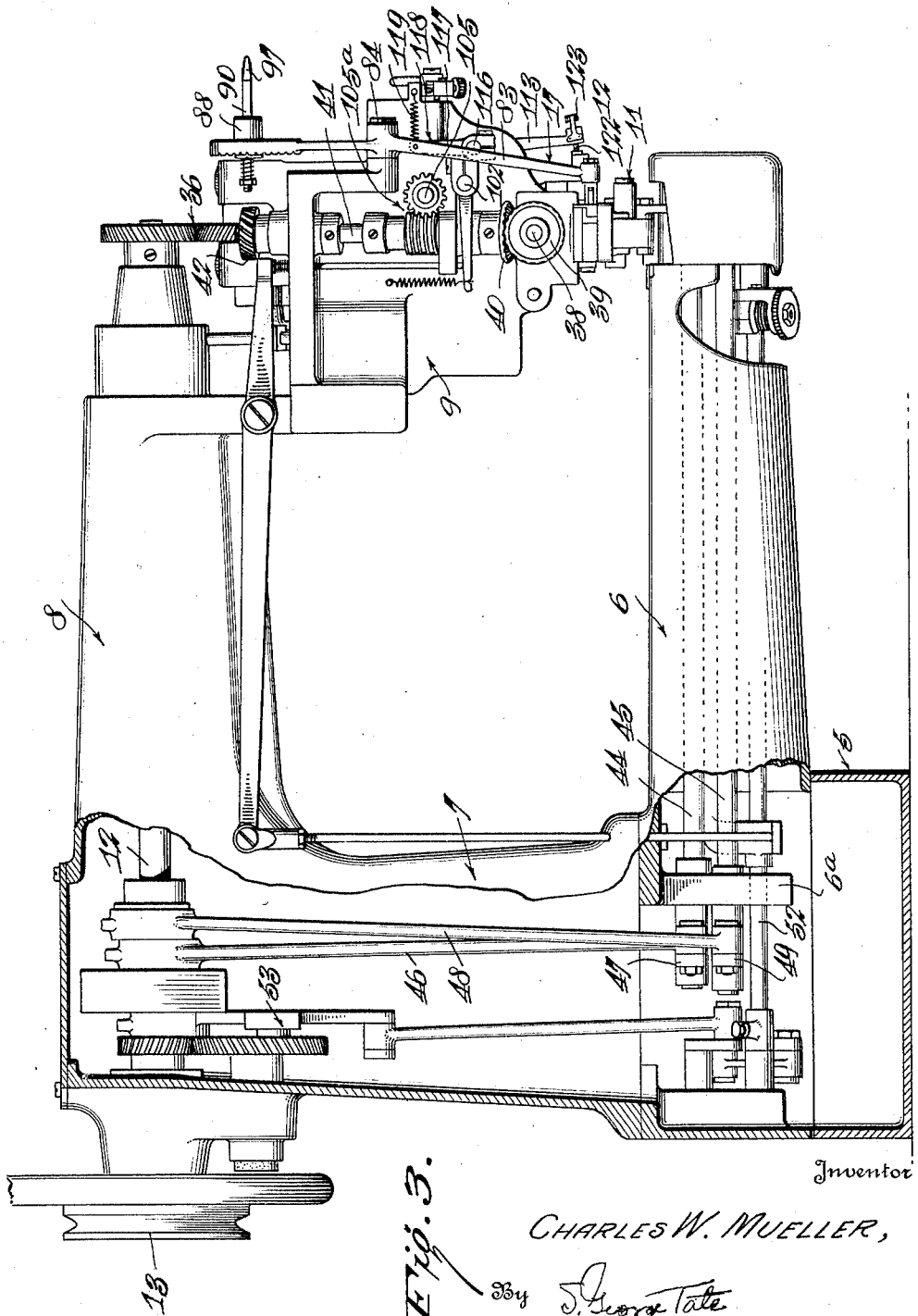

Dec. 10, 1929.     C. W. MUELLER     1,739,080
LINING FELLING MACHINE
Filed Aug. 26, 1927      6 Sheets-Sheet 4
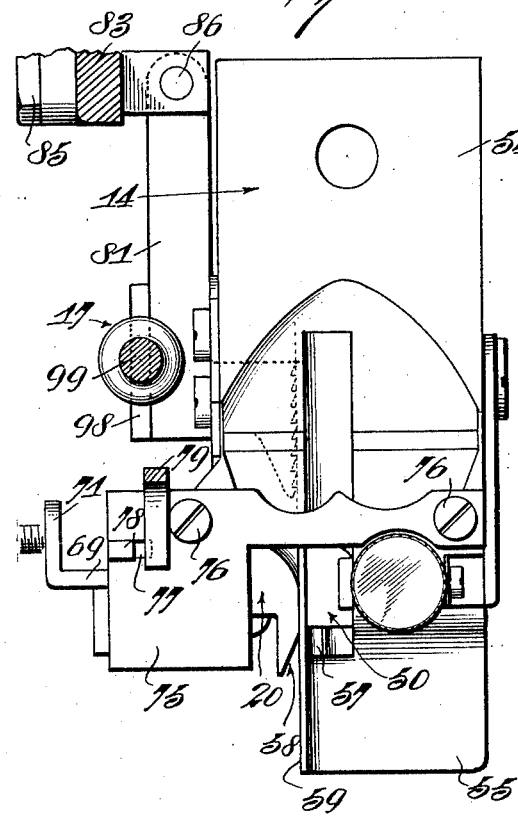
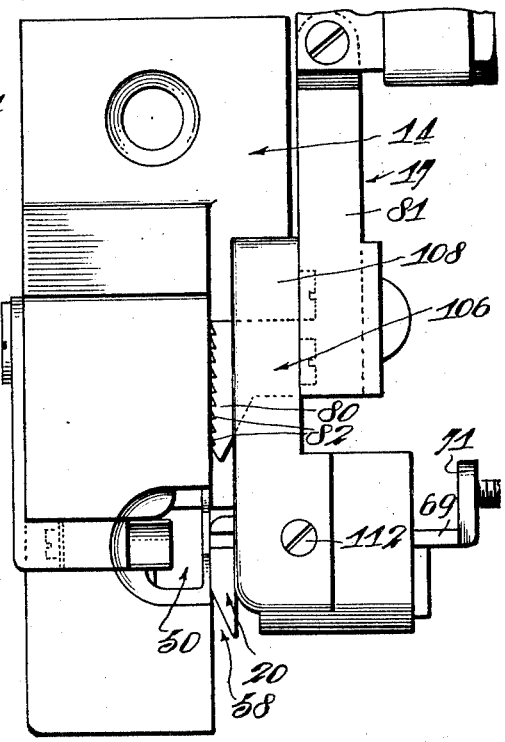
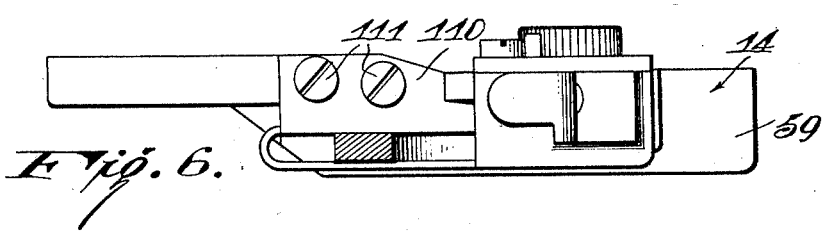
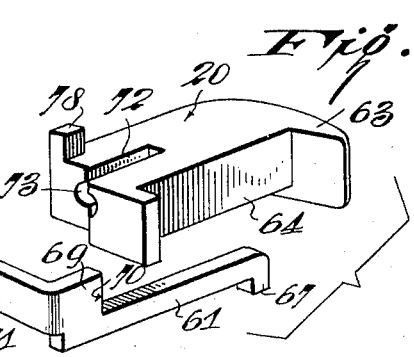
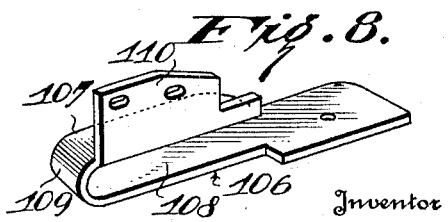
Inventor
CHARLES W. MUELLER,
By George Tate
Attorney Dec. 10, 1929.  C. W. MUELLER  1,739,080
LINING FELLING MACHINE
Filed Aug. 26, 1927   6 Sheets-Sheet 5
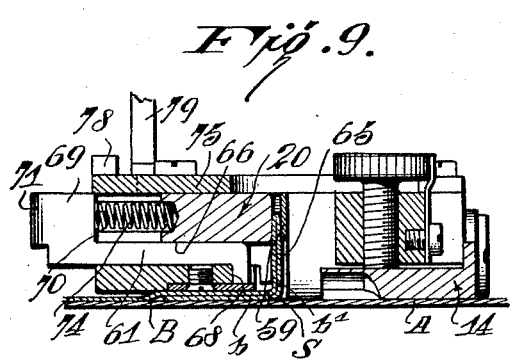
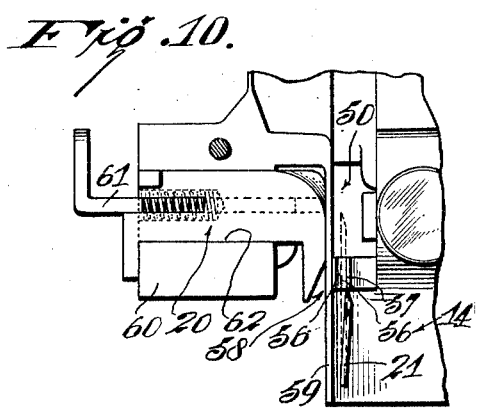
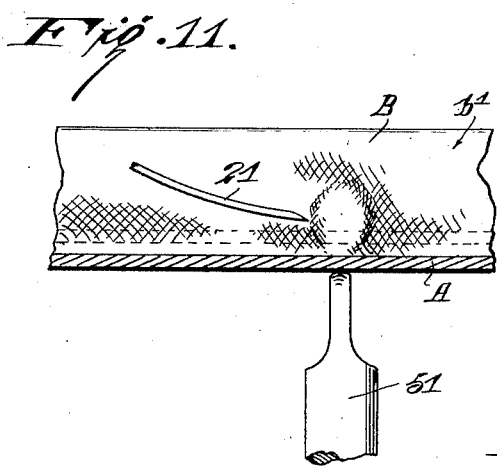
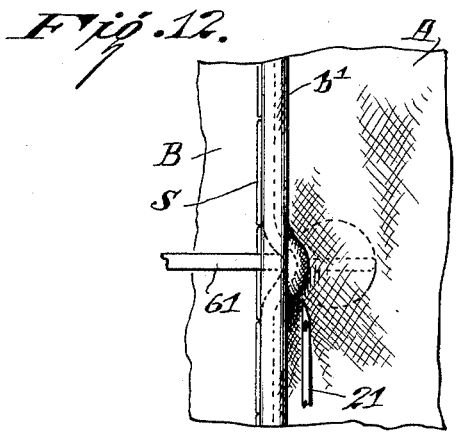
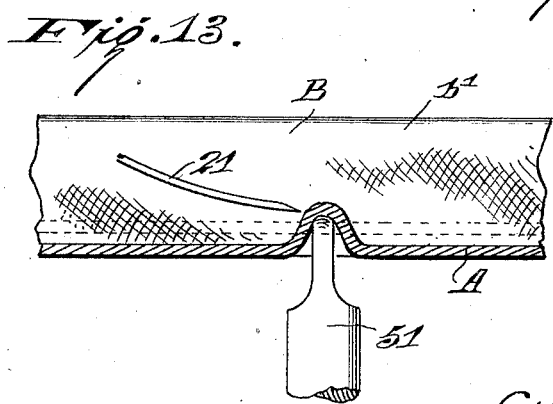
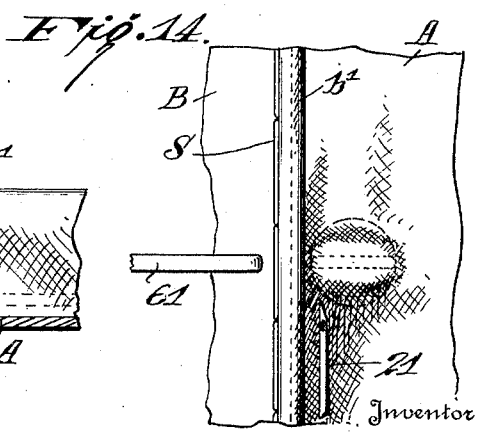
CHARLES W. MUELLER,
By J. George Tate
Attorney Dec. 10, 1929.       C. W. MUELLER       1,739,080
LINING FELLING MACHINE
Filed Aug. 26, 1927    6 Sheets-Sheet 6

INVENTOR
CHARLES W. MUELLER
BY S. George Tate
ATTORNEY

Patented Dec. 10, 1929

1,739,080

UNITED STATES PATENT OFFICE

CHARLES W. MUELLER, OF ST. LOUIS, MISSOURI, ASSIGNOR TO LEWIS INVISIBLE STITCH MACHINE COMPANY, OF ST. LOUIS, MISSOURI, A CORPORATION OF MAINE

LINING-FELLING MACHINE

Application filed August 26, 1927. Serial No. 215,701.

This invention relates to new and useful improvements in blind stitch felling machines which are especially adapted for felling a superposed layer upon a base layer of material. The present invention is particularly intended for use in felling the edges of coat linings to the body of the garment, the line of blind stitches connecting the superposed lining or layer and the base layer or body fabric, being disposed at a considerable distance from the infolded edge of the lining and extending parallel with said infolded edge whereby the infolded edge portion of the lining may afterwards be pressed down onto the base layer and thereby cover the line of blind stitches.

This invention embodies several improvements over my co-pending application Serial No. 186,674, filed April 26, 1927.

Heretofore in stitching linings to the body fabric of coats, it has been customary to first superpose the lining on the body fabric, then inturn the edge portion of the lining, then to secure the lining to the body fabric by a second line of basting stitches disposed in parallelism with the first mentioned line of basting stitches and to leave a fullness of lining material between said lines of basting stitches, then to secure the extreme folded edge of the lining to the body fabric by a line of blind stitches, then to remove the first line of basting stitches, then removing the fullness to the lining by folding the same over the felled edge, then pressing the lining and finally removing the second formed line of basting stitches. This mode of operation is decidedly objectionable for the reason that more or less fullness in the lining is liable to be formed and consequently the folded edge of the lining which overlaps and covers the line of blind stitches may or may not run straight. Furthermore, inasmuch as practice calls for an extended margin or overlapping portion of a uniform width, it will be readily apparent that if the two lines of basting stitches are not formed in straight lines and in exact parallelism the resultant extended margin will vary to a corresponding extent.

To overcome the above objection, I first superpose a coat lining on the body fabric, then infold the marginal edge portion of the lining, and then secure said infolded edge portion to the body fabric along a line extending parallel with the folded edge and at a considerable distance therefrom. The assembly is then fed through the machine by my improved feeding mechanism with the folded edge portion extending upwardly in a plane at substantially right angles to the body fabric, the under ply of the upturned folded edge portion being secured to the body fabric by a line of blind stitches which extend in close proximity to the line of basting stitches, thus insuring a uniform width or margin to the folded edge portion of the lining which overlaps the line of blind stitches.

In my co-pending application above referred to, I employ a vibrating or shogging needle which on one stroke engages the base layer or body fabric only and on the next stroke engages the upturned folded edge portion of the superposed layer or lining only, in combination with lower and upper plungers for alternately projecting nodes or ridges of the base and superposed layers respectively into the paths of needle movements.

One of the principal objects of the present invention is to provide a blind stitch felling machine for performing the above described operation and employing in said machine a non-shogging needle which oscillates in a single plane for alternately engaging the base layer and the superposed layer.

Another object of the invention is to provide a work presenting mechanism for the purpose set forth which includes a top feed mechanism for engaging and feeding the upturned marginal edge portion of the superposed layer past the stitch forming mechanism, in combination with manually operable means for quickly varying the feed stroke of the top feed mechanism without the necessity of removing any of the parts of the sewing machine in order to obtain access for such adjustment.

In some classes of work, such as in the under-felling of ladies' coats, the lining is of very thin material and a plait is initially formed in the basted lining so as to result in sufficient fullness after the lining has been completely attached to the body fabric. Therefore this plait contains a number of thicknesses or layers and unless some means were provided to adjust the upper plunger mechanism so as to vary the working position thereof, the needle would penetrate a number of these layers at the point of the plait.

It is therefore another object of the present invention to provide a hand controlled means for quickly adjusting the plunger mechanism so as to vary the working position thereof in order to insure the needle penetrating the outer layer only of the plait, and to restore said plunger to its normal working position after the plait has been fed past the stitch forming mechanism.

With these and other objects in view which will more fully appear, the nature of the invention will be more clearly understood by following the description, the appended claims, and the several views illustrated in the accompanying drawings.

Figure 2:
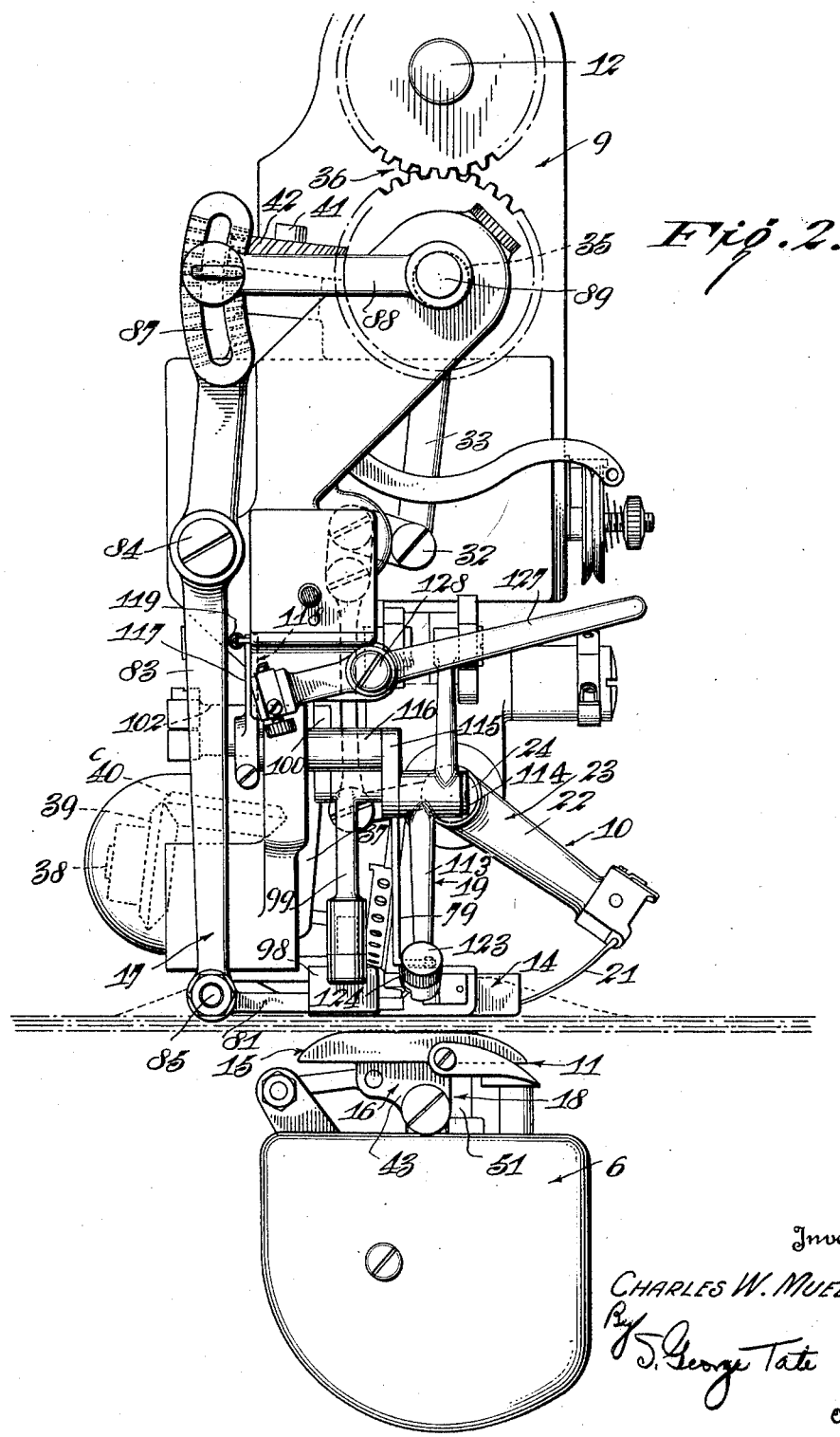

In the drawings:

Figure 1 is an enlarged front elevation of the stitching head and work support of a sewing machine embodying my invention, Figure 2 is an end elevation thereof, Figure 3 is a rear elevation of the machine, parts thereof being shown in section.

Figure 15:
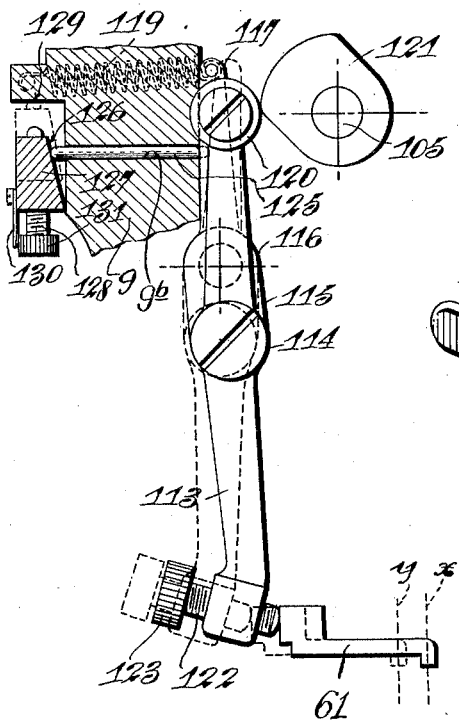
Figure 16:
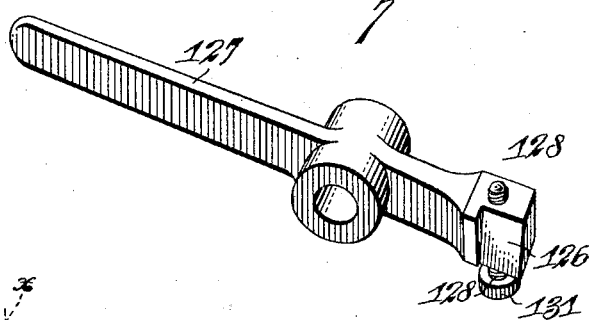
Figure 17:
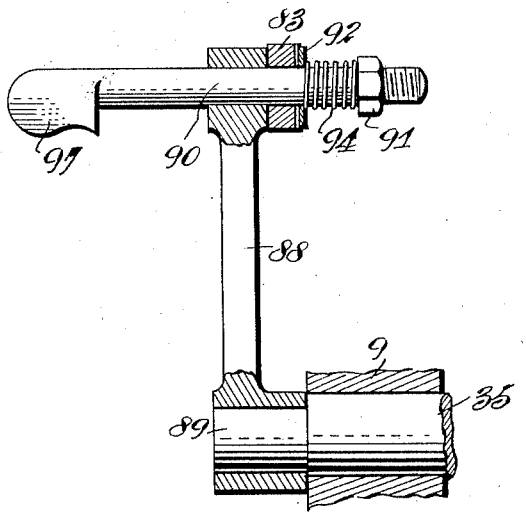
Figure 18:
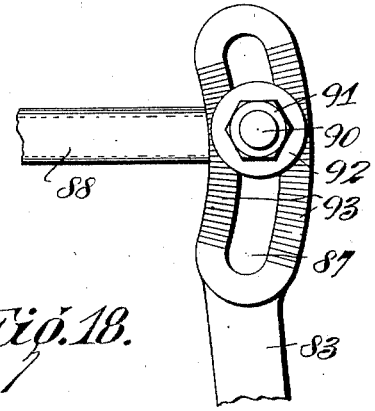

Figure 4 is an enlarged top plan view of the main presser foot and the associated parts, Figure 5 is a bottom plan view thereof, Figure 6 is a side elevation of said main presser foot, the view also showing the top feed dog, Figure 7 is a perspective view of the movable presser foot and the upper plunger, the parts being shown in separated relation, Figure 8 is a perspective view of the guide for the upper feed dog, Figure 9 is a transverse sectional view taken on Figure 4, Figure 10 is an enlarged detail plan view showing the mounting of the movable presser foot and the upper plunger, Figure 11 is a view showing more or less diagrammatically the position of the needle just prior to entering the node formed in the upturned edge portion of the superposed layer by the upper plunger, Figure 12 is a top plan view thereof, Figure 13 is a view similar to Figure 11 but showing the position of the needle just prior to the same entering the node of material formed in the base layer by the lower plunger, Figure 14 is a top plan view thereof, Figure 15 is a detailed view showing the upper plunger mechanism and the manually operable means for adjusting the working position of said upper plunger, Figure 16 is a perspective view of the hand controlled lever for effecting said adjustment, Figure 17 is a detailed horizontal sectional view showing the adjustable connection in the top feed mechanism for varying the feed stroke of the top feed dog, and Figure 18 is a detailed elevation showing the upper end of the feed lever and the adjustable link connection therewith.

Like reference numerals designate corresponding parts throughout the several figures of the drawings.

The present invention is illustrated herein as embodied in a blind stitch sewing machine of the Lewis type, and comprises a frame which includes a base 5, a laterally extending work arm 6, a standard 7, an overhanging arm 8, and a stitching head 9 which is secured to the free end of the overhanging arm 8 and is disposed above the outer end of the work arm 6.

The felling operation for which this machine is particularly adapted is illustrated in Fig. 9. In this figure I have shown a base layer A, which may be the body fabric of a coat, and a superposed layer B, which may be the lining therefor. The lining B has its marginal edge portion infolded, as indicated at $b$, and this infolded portion is secured to the body fabric A by means of a line of basting stitches S which extends parallel to the folded edge portion and at a point somewhat removed therefrom so as to form a fairly wide marginal folded portion $b'$. The parts thus joined are fed through the sewing machine forming my invention with the marginal folded portion $b'$ turned up into a vertical plane. As the work is fed through the sewing machine, the upper and lower layers are united by a line of blind stitches, said stitches including a plurality of needle thread loops which alternately enter and emerge from the base layer A and the infolded edge portion $b$ of the marginal folded portion $b'$ of the upper layer of lining B, said needle thread loops being anchored by a bobbin thread. The line of blind stitches is located in close proximity to the corner or angle between the base layer and the marginal folded portion $b'$ whereby after the article has been felled, said marginal folded portion may be returned to its normal or horizontal position and thereby completely cover the line of formed blind stitches. The line of basting stitches S is then withdrawn.

The machine includes a stitch forming mechanism which I have indicated as a whole by the reference numeral 10, and a work presenting mechanism which I have indicated as a whole by the reference numeral 11. Both the stitch forming mechanism 10 and the work presenting mechanism 11 are operated from a main rotary shaft 12 which extends longitudinally of the overhanging arm 8 and across the standard 7. A grooved pulley 13 is fixed to the end of the shaft 12 opposite the stitching head 9 and is adapted to be driven by any suitable power.

The work presenting mechanism consists of a main presser foot 14 which is fixed to the stitching head 9, a work clamp 15 which cooperates with the work below said main presser foot, a lower feeding mechanism 16, an upper feeding mechanism 17, a lower plunger mechanism 18, an upper plunger mechanism 19, and a movable presser foot 20.

The needle mechanism 10 includes a reciprocatory non-shogging needle 21 having its path of movement in a single plane parallel with the line of feed. The needle 21 is secured to the arm 22 of a needle lever 23 which is journaled on a fixed shaft 24 secured to the stitching head 9. The needle lever 23 is mounted on the stub shaft 24 for oscillatory movements only about said shaft. The other arm of the needle lever 23 is pivotally connected as at 26 with the lower end of a link 27, the upper end of said link being pivotally connected as at 28 to one arm 29 of a bell crank lever 30 which is journaled on the stitching head 9, the other arm 31 of the bell crank lever being pivotally connected as at 32 with the lower end of a link 33. The upper end of the link 33 is connected to an eccentric pin 34 formed on a jack shaft 35 which is journaled in the stitching head 9 below the main shaft 12 and extends in parallelism therewith. A "1 to 1" gear coupling 36 connects the main shaft 12 and the jack shaft 35 and consequently during each complete rotation of the main shaft 12 the needle 21 is thereby given a complete reciprocation in the line of feed.

Cooperating with the needle 21 to form a line of straight-away stitches is a rotary hook 37 and this hook is given two complete rotations to each reciprocation of the needle. The hook is fixed to a shaft 38 (see Fig. 3) and fixed to this shaft is a bevel gear 39 which is driven from a corresponding bevel gear 40 fixed on a vertical shaft 41 which is driven by said gear coupling through a gear 42. Inasmuch as the gear coupling 39—40 is a "1 to 1" coupling, the hook 37 will be rotated during each rotation of the vertical shaft 41.

The main presser foot 14 is fixedly secured to the lower portion of the stitching head 9 and cooperating with the underface of the presser foot is the work clamp 15, the lower feed mechanism 16, and the lower plunger mechanism 18.

The lower feeding mechanism 16 includes a feed dog 43 which is of the 4-motion type and the mechanism for operating this feed dog is substantially identical with that shown in my former Patent 1,588,132, issued June 8, 1926. The backward and forward movement of the feed dog is obtained through the medium of a rock shaft 44, which I term the "feed travel" shaft, and the up and down movement of the feed dog is obtained from a rock shaft 45, which I term the "feed lift" shaft. These rock shafts 44—45 extend longitudinally within the work arm 6 and have their righthand ends journaled in a bearing lug 6ª and their lefthand ends journaled in suitable bearings.

In order to rock the "feed travel" shaft 44 and the "feed lift" shaft 45, I provide the main shaft 12 with two eccentrics. A connection rod 46 has its upper end engageable with one of said eccentrics and has its lower end pivotally connected to a rock arm 47 fixed to the "feed travel" shaft 44. A connection rod 48 has its upper end engageable with the other eccentric mounted on the main shaft and has its lower end pivotally connected to a rock arm 49 fixed to the "feed lift" shaft 45. The connection rods 46 and 48 are disposed within the standard 7 of the machine frame and the eccentrics which are mounted on the main shaft for actuating these rods are timed so as to bring about a 4-motion movement to the feed dog.

As previously stated this particular machine is adapted for felling coat linings to the body fabric and this material is fed past the stitch forming mechanism whereby the needle during one reciprocation will enter the base layer and emerge therefrom and on the next reciprocation the needle will enter the under ply of the upturned folded portion and emerge therefrom. In order to position the base layer whereby the needle will penetrate and emerge therefrom, I have provided the lower plunger mechanism 18 which is illustrated and described in my co-pending application Serial No. 186,672, filed April 26, 1927, and which includes a vertically reciprocatory plunger for projecting a node of the base layer material into needle penetrating position. For this purpose, I have provided the main or fixed presser foot 14 with a vertical opening 50 which is located directly below the stub shaft 24 which supports the needle lever 23. The plunger mechanism 18 includes a plunger 51 which is disposed directly below the opening 50 formed in the main presser foot. The plunger is reciprocated from the rock shaft 52 which extends within the work arm 6 and is suitably journaled therein.

It is desirable to variably oscillate the plunger rock shaft 52 so as to alternately reciprocate the plunger to high and low positions, whereby the plunger will on its high position project a node of base material into needle penetrating position, and whereby the plunger in its low position will not project a node of said material into needle penetrating position. To this end, I have provided a driving connection 53 between the plunger operating shaft 52 and the main rotary shaft 12 which includes a toggle for insuring the plunger partaking of its long and short strokes during alternate rotations of the main shaft.

The main presser foot 14 includes a heel 54 and a toe 55, the opening 50 being located therebetween. The upper face of the toe 55 is provided with a needle guide 56 which extends in the line of feed and is disposed directly in front of the opening 50, the guide including a righthand wall 57. The toe 55 is also provided with a longitudinally extending guideway 58 for the upturned folded portion $b'$ of the lining, as will be hereinafter fully explained. This guideway 58 extends in the line of feed and includes a vertical wall 59 which is carried by the toe 55, the wall extending in the line of feed and being disposed on the lefthand side of the needle guide 56. The guideway extends from a point in front of the needle guide 56 to a point in rear of the opening 50 so as to guide the upturned folded portion $b'$ of the fabric in a vertical plane past the point of needle penetration. Located on the lefthand side of the guideway 58 is an offset presser foot portion 60 which supports the horizontally movable presser foot 20 and a horizontally reciprocable upper plunger 61, both the presser foot 20 and the plunger 61 being disposed in a vertical plane containing the point of needle penetration and disposed at right angles to the line of feed. In other words, the lower plunger 51, the opening 50, the horizontal presser foot 20, and the upper plunger 61 are all located in the same vertical plane containing the point of needle penetration.

The offset portion 60 of the main presser foot 14 is formed in its upper face with a recess or seat 62 which extends across said portion from one side to the other. The movable presser foot 20 includes a foot portion 63 which is disposed within the guideway 58 for cooperation with the vertical wall 59, and a shank 64 which is mounted within the seat or recess 62 for relative sliding movement. The foot portion 63 extends across an opening 65 formed in the lower portion of the vertical guiding wall 59 at a point in alinement with the opening 50. The upper horizontal plunger 61 is slidably mounted in a guiding groove 66 formed in the lower face of the shank 64 of said presser foot 20, the guiding groove extending longitudinally of the shank and also extending through the foot portion 63 so as to position said upper plunger 61 in alinement with the point of needle penetration. The plunger 61 includes at its inner end a downwardly extending stop 67 which cooperates with a vertical wall 68 formed on the offset portion 60 of the main presser foot to limit the outward movement of said upper plunger. The outer end of the upper plunger 61 is provided with an upwardly extending arm 69 forming a resultant stop shoulder 70 at its inner vertical edge. The arm 69 is bent rearwardly to form a bearing arm 71. The arm 69 is adapted to slide within a correspondingly shaped recess 72 formed in the outer end of the shank 64 of the presser foot 20. Formed in the shank 64 and opening into the recess 72 is a seat 73 for receiving one end of a coiled spring 74, the upper end of said spring extending outwardly within the recess 72 and engaging the shoulder 70 formed on the upper plunger 61. As a result, the spring 74 tends to push the upper plunger 61 outwardly to its limit of movement which is fixed by the stop arm 67 engaging the shoulder 68. Simultaneously the spring 74 exerts an inward pressure against the movable presser foot 20 so as to yieldably hold said presser foot against the vertical guide wall 59. Thus the movable presser foot 20 is yieldably held against the guiding wall 59 and simultaneously the upper plunger 61 is yieldably held in its inoperative position at one side of the guideway 59. A cover plate 75 is secured to the presser foot 14 by screws 76—76 and extending upwardly through an opening 77 formed in said cover plate is an arm 78 which is fixed to the movable presser foot 20 and is adapted to be engaged by a lever 79 for moving said presser foot 20 outwardly against the tension of the spring 74.

The upper feeding mechanism 17 cooperates with the lower feeding mechanism 16 to feed both the upper and lower layers of material in unison. This upper feeding mechanism forms the subject matter of my copending application Serial No. 186,673, filed April 26, 1927, and includes a feed dog 80 which is fixed to a feed bar 81. The feed dog 80 is provided with a series of fabric engaging teeth 82, and this dog is mounted for feeding movements in a horizontal plane, that is, the feeding movements of the upper feed dog are in a plane at right angles to the feeding movements of the lower feed dog. The upper feed dog 80 is located in rear of the offset portion 60 of the main presser foot 14 and the teeth 82 cooperate with that portion of the guiding wall 59 which extends in rear of the movable presser foot 20. Four motions are imparted to the feed dog 80, that is, back and forth and in and out, the back and forth movements being in the line of feed, whereas the in and out movements are in a plane transverse to the line of feed. The feeding movements of the feed dog 80 are in unison with the feeding movements of the lower feed dog 43. In order to reciprocate the upper feed dog 80 forwardly and backwardly, I have provided a vertically extending lever 83 which is fulcrumed on a horizontal axis 84 on the rear face of the stitching head 9, the lower end of the lever 83 being pivotally connected to the feed bar 81 by right angle connections 85—86, the former being a horizontal pivot and the latter a vertical pivot. The upper end of the lever 83 is provided with a segmental slot 87 having an adjustable connection with a pitman or link 88, the other end of the pitman being connected to an eccentric pin 89 fixed to the shaft 35. This adjustable connection includes a horizontal pin 90 which is fixed to the link or pitman 88. One end of the pin extends through the segmental slot 87 and carries a nut 91. A clamp disc 92 has its inner face knurled for engagement with the roughened face 93 of the lever 83. A coil spring 94 is disposed intermediate the disc 92 and the nut 91 and serves to retain the pin 90 in any position of adjustment along the slot 87. The other end of the pin 90 extends through a slot 95 formed in a cover plate 96 and is provided with a finger piece 97. The cover plate 96 covers the stitch forming mechanism and is supported on the stitching head 9. Thus the operator may have immediate access to said adjustable connection and thereby quickly adjust the feed stroke of the upper feed dog 80 whenever desired. By means of this connection, the pin 90 will be retained automatically in any position of adjustment.

Inasmuch as the shaft 35 is driven by a "1 to 1" gear coupling 36 it will be apparent that the upper feed dog will be given a complete backward and forward movement during each complete rotation of the main shaft 12, or during one complete oscillation of the needle 21. In order to impart in and out movements to the upper feed dog 80, I have provided the feed bar 81 with an upwardly extending slide plate 98. This plate is preferably formed integral with the feed bar 81 and extends longitudinally of said bar. An operating lever 99 has its lower end slotted to form a fork for engaging the slide plate 98. The lever 99 is fulcrumed intermediate its ends on a crank pin 100 fixed to a crank arm 101 mounted on a crank shaft 102 which is journaled in the stitching head 9 with its axis parallel to the line of feed. The upper end of the operating lever 99 is provided with a cam roller 103 which has direct contact with a peripheral cam 104 fixed to a shaft 105 journaled in the head 9 and driven from the shaft 41 by a "1 to 4" gear coupling 105ª. A spring 99ª has one end connected to the upper end of the operating lever 99 and the other end connected to the stitching head 9 for yieldably retaining the cam roller 103 in engagement with the cam 104. The cam 104 (Fig. 1) is formed with opposed high points $h$ and $i$ of equal radius, and inasmuch as the shaft 105 makes one complete rotation to every two complete rotations of the main shaft 12, it will be apparent that the operating lever 99 will be given a complete oscillation during each complete rotation of the main shaft 12.

The lever 79 which cooperates with the upwardly extending arm 78 of the movable presser foot 20 has its upper end fixed to the crank pin 100.

In order to support the upper feed dog 80 during its movements, I have provided the main presser foot 14 with a guide 106 which consists of upper and lower plates 107 and 108 united by a connecting portion 109. The plates are spaced apart a distance sufficient to receive the feed dog 80. The guide 106 is supported from the lefthand side of the presser foot by means of a flange 110 and attaching screws 111, the flange being connected to the upper plate 107. The forward end of the lower plate 108 extends under the offset portion 60 of the presser foot 14, and is secured to the offset portion by a screw 112. The guide 106 is spaced from the guiding wall 59 so as to form therebetween the guideway 58. The lower plate 108 of the guide is disposed slightly above the bottom of the main presser foot 14 for cooperation with the lefthand feed section of the lower feed dog 43.

In order to reciprocate the upper plunger 61 in timed relation to the needle penetrations, I have provided an operating lever 113 which is fulcrumed intermediate its ends on a crank pin 114 fixed to a crank arm 115 carried by a crank shaft 116 which is mounted for oscillations in the stitching head 9, the axis of the shaft being parallel to the crank shaft 102. Fixed to the rear end of the crank shaft 116 is a stop arm 117 which is adapted to slide in a groove 118 formed in said stitching head. This groove 118 extends horizontally and the top and bottom walls thereof limit the amount of oscillation not only of the stop arm 117 but also of the crank shaft 116. A spring 119 has one end connected to the stop arm 117 and the other end connected to the stitching head 9. This spring 119 serves to hold the arm 117 against one side wall of the groove 118 and thereby yieldably retain the crank shaft 116 against oscillation. The upper end of the lever 113 carries a cam roller 120 which is yieldably held by the spring 74 of the movable presser foot 20 in direct contact with a peripheral cam 121 fixed to the shaft 105. The lower end of the operating lever 113 carries an adjusting screw 122 for direct contact with the bearing arm 71 of the upper plunger 61. The screw 122 is provided with a knurled head 123 and a spring retainer finger 124 is fixed to the lower end of the lever 113 for cooperation with said knurled head to hold the screw in any position of adjustment. By means of the screw 122 the inward movement of the upper plunger 61 may be adjusted to vary the working or operative position of said upper plunger. The cam 121 has a single high point and the cam is timed on the shaft 105 so as to actuate the lever 113 and thereby project the upper plunger to working position in advance of alternate penetrating movements of the needle.

Referring particularly to Figure 10, it will be observed that I have set the needle at a slight angle to the line of feed whereby the needle in its forward movement will engage and cooperate with the righthand wall 57 of the needle gunde 56 and thereby cause said needle to be sprung into the plane containing the line of feed. Thus the needle as it passes through the node of material will remain in said path of movement in the line of feed and consequently by the needle thus engaging the righthand wall of the needle guide said needle will be more rigidly retained during its penetrating movement.

In some classes of work, as in the underfelling of ladies' coats, the lining is of very thin material and a plait is initially formed in the basted lining so as to result in sufficient fullness after the lining has been completely attached to the body fabric. Therefore this plait contains a number of thicknesses or layers and unless some means were provided to adjust the upper plunger mechanism so as to vary the working position thereof, the needle would penetrate a number of these layers at the point of the plait.

The working position of the upper plunger may of course be adjusted by the screw 122, but this necessitates an adjustment of the screw 122 both before and after each plait is fed through the machine. It is, therefore, desirable to provide a manually operable means by means of which the working position of the upper plunger may be initially set prior to the garment being fed through the machine and instantly operated while the plait is being fed past the stitch forming mechanism.

To this end, I have provided the stitching head 9 with a horizontal opening $9^b$, as shown particularly in Fig. 15. This opening extends in a plane at right angles to the line of feed and in alinement with the arm 117 which is fixed to the crank shaft 116. Normally the arm 117 is held against the side wall of the groove 118 by the spring 119 and the righthand end of the pin 125 normally engages said arm 117, said pin being freely mounted in the opening $9^b$. The lefthand end of the pin 125 normally projects outwardly beyond the lefthand face of the stitching head 9 for engagement with the cam face 126 of the manually operable lever 127 which is fulcrumed as at 128 on the stitching head 9. Upon downward pressure of the handle portion of the lever 127, the cam face 126 will be moved upwardly and thereby cam the pin 125 to the right, thus rocking the crank shaft 116 against the tension of the spring 119. As a result, the fulcrum 114 of the lever 113 will be moved to the left and consequently the working position of the upper plunger 61 will be shifted from the line $x$ to the line $y$. In Fig. 15, I have illustrated the above adjustment more or less diagrammatically and in a more or less exaggerated manner in order to clearly show the action of said adjustment. The amount of this adjustment may be regulated by a screw 128 which is threaded into the lever 127 for engagement with the stop shoulder 129 formed on the stitching head 9. A spring finger 130 cooperates with the knurled head 131 of the screw to retain the latter in any position of adjustment.

In the operation of my invention for felling coat linings, the base layer A and the superposed layer or lining B are first united by the line of basting stitches S, the basting stitches also serving to anchor the infolded edge portion $b$ of the folded marginal portion $b'$ of the lining.

The work is then fed into the machine, the base layer A being positioned between the main presser foot 20 and the lower feed dog 43 and work clamp 15, the main portion of the lining B being disposed under the left side of the main presser foot 14, and the upturned marginal edge portion $b'$ of the lining being directed into the vertical guideway 58. Thus the base layer A is directly engaged by the lower feed dog 43 and the upturned marginal edge portion $b'$ of the lining is directly engaged by the upper feed dog 80. The two feed dogs operate in planes at right angles to each other and are intermittently actuated in unison to feed both layers of fabric past the stitch forming mechanism, thus avoiding all drag to the superposed layer or lining B. The lower plunger 51 is moved upwardly on its long stroke to project a node of base layer material into the path of needle reciprocation, as shown in Figs. 13 and 14. While the plunger retains the node in this position the needle 21 is moved forwardly to enter and emerge from said node formed in the base layer, the needle thread loop cooperating with the rotary hook to form an anchored needle thread loop in said node. The needle is then returned to its initial position and immediately after the needle point is withdrawn from the node, the upper and lower feed dogs cooperate with the vertical guide wall 59 and the main presser foot 14 respectively to feed the material a stitch length. The upper plunger 61 is then moved to the right to project a node of the upturned marginal portion of the superposed layer through the opening 65 of the guide wall 59 to position for penetration by the needle 21 on its next forward movement. In the meantime the lower plunger 51 has been given its short stroke which is an idle one because it does not project a node of base layer. The needle, of course, cooperates with the rotary hook to form an anchored needle thread loop in the node of the superposed layer. It will be noted that the guiding wall 59 and the movable presser foot 20 cooperate to clamp the upturned marginal portion $b'$ of the lining B therebetween, thus holding the fabric for the thrust of the upper plunger as well as holding the fabric against the thrust of the needle. This is a very important feature because the lining B being of very thin fabric it is necessary in order to insure the needle entering and emerging from the face of the fabric not only at uniform depths but also at uniform intervals. The needle is then returned to its initial position and the upper plunger is likewise returned to its initial position. The feed dogs again function during the last part of the retracting movement of the needle to feed the material a stitch length. Thus one complete cycle of operation has been completed.

It is of course to be understood that the details of structure and arrangements of parts may be variously changed and modified without departing from the spirit and scope of my invention.

I claim:

1. In a blindstitch sewing machine for felling a superposed layer to a base layer, the combination with a stitch forming mechanism including a non-shogging needle reciprocatory in a single plane in the line of feed, and a work presenting mechanism including a presser foot and a cooperating feeding mechanism, a vertically disposed guide extending from in front of the point of needle penetration to the rear thereof for directing the upturned edge portion of the superposed layer past the stitch forming mechanism, means for projecting nodes of the base layer and the upturned portion of the superposed layer respectively into needle penetrating positions, and separate means for respectively clamping the base layer against the presser foot and the upturned portion of the superposed layer against the guide during the formation of said nodes in said layers by said plungers.

2. In a blindstitch sewing machine for felling a superposed layer to a base layer, the combination with a stitch forming mechanism including a non-shogging needle reciprocatory in a single plane in the line of feed, and a work presenting mechanism including a presser foot and a cooperating feeding mechanism, a vertically disposed guide extending from in front of the point of needle penetration to the rear thereof for directing the upturned edge portion of the superposed layer past the stitch forming mechanism, upper and lower plungers for alternately projecting nodes of the superposed layer and the base layer into needle penetrating positions, whereby the needle on one stroke will enter and emerge from the upturned edge portion only and on the next stroke will enter and emerge from the base layer only, means for actuating said plungers, and separate means for respectively clamping the base layer against the presser foot and the upturned portion of the superposed layer against the guide during the formation of said nodes in said layers by said plungers.

3. In a blindstitch sewing machine for felling a superposed layer to a base layer, the combination with a reciprocatory needle and a complemental stitch forming mechanism, and a work presenting mechanism including means for guiding an upturned marginal portion of the superposed layer past the stitch forming mechanism, a horizontally reciprocatory plunger for projecting a node of said upturned marginal portion into needle penetrating position, and manually operable means including a cam for varying the working position of the plunger relative to the path of needle reciprocation.

4. In a blindstitch sewing machine for felling a superposed layer to a base layer, the combination with a reciprocatory needle and a complemental stitch forming mechanism, and a work presenting mechanism including means for guiding an upturned marginal portion of the superposed layer past the stitch forming mechanism, a horizontally reciprocatory plunger for projecting a node of said upturned marginal portion into needle penetrating position, and manually operable means including a cam lever for varying the working position of the plunger relative to the path of needle reciprocation.

5. In a blindstitch sewing machine for felling a superposed layer to a base layer, the combination with a reciprocatory needle and a complemental stitch forming mechanism, and a work presenting mechanism including means for guiding an upturned marginal portion of the superposed layer past the stitch forming mechanism, a horizontally reciprocatory plunger for projecting a node of said upturned marginal portion into needle penetrating position, a lever for reciprocating said plunger having a shiftable fulcrum, and manually operable means for shifting said fulcrum to vary the working position of the plunger relative to the path of needle reciprocation.

6. In a blindstitch sewing machine for felling a superposed layer to a base layer, the combination with a reciprocatory needle and a complemental stitch forming mechanism, and a work presenting mechanism including means for guiding an upturned marginal portion of the superposed layer past the stitch forming mechanism, a horizontally reciprocatory plunger for projecting a node of said upturned marginal portion into needle penetrating position, a crank shaft, a crank pin on said shaft, a lever for reciprocating said plunger fulcrumed on said crank pin, means for yieldably retaining said crank shaft against oscillation, and manually operable means for oscillating said crank shaft against the tension of said yieldable means for varying the working position of the plunger relative to the path of needle reciprocation.

7. In a blindstitch sewing machine for felling a superposed layer to a base layer, the combination with a reciprocatory needle and a complemental stitch forming mechanism, and a work presenting mechanism including means for guiding an upturned marginal portion of the superposed layer past the stitch forming mechanism, a horizontally reciprocatory plunger for projecting a node of said upturned marginal portion into needle penetrating position, a crank shaft, a crank pin on said shaft, a lever for reciprocating said plunger fulcrumed on said crank pin, a crank arm on said shaft, a spring connected to said crank arm for yieldably retaining said crank shaft against oscillation, and means including a manually operable cam lever cooperating with the crank arm for oscillating said crank shaft against the tension of said yieldable means for varying the working position of the plunger relative to the path of needle reciprocation.

In testimony whereof I hereunto affix my signature.

CHARLES W. MUELLER.